(12) United States Patent
Tsukamoto et al.

(10) Patent No.: US 8,550,534 B2
(45) Date of Patent: Oct. 8, 2013

(54) WORKING MACHINE

(75) Inventors: Hironori Tsukamoto, Hiroshima (JP); Shintaro Sakitani, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 360 days.

(21) Appl. No.: 12/621,063

(22) Filed: Nov. 18, 2009

(65) Prior Publication Data

US 2010/0146860 A1    Jun. 17, 2010

(30) Foreign Application Priority Data

Dec. 17, 2008 (JP) ................................ 2008-321455

(51) Int. Cl.
*B62D 33/06* (2006.01)
*B62D 25/10* (2006.01)

(52) U.S. Cl.
USPC ............... 296/146.1; 296/190.08; 180/69.21; 180/69.24

(58) Field of Classification Search
USPC ......... 108/68.1, 68.4, 69.2; 296/146.1, 181.1, 296/207, 190.01, 190.03, 190.08
See application file for complete search history.

(56) References Cited

U.S. PATENT DOCUMENTS

| | | | | |
|---|---|---|---|---|
| 2,711,341 A | * | 6/1955 | Mills et al. | 296/203.01 |
| 3,414,316 A | * | 12/1968 | Williams et al. | 296/190.08 |
| 4,125,170 A | * | 11/1978 | Botz | 180/69.21 |
| 4,436,330 A | * | 3/1984 | Mayo et al. | 292/263 |
| 4,572,312 A | * | 2/1986 | France et al. | 180/69.21 |
| 5,193,636 A | * | 3/1993 | Holm | 180/68.1 |
| 5,215,157 A | | 6/1993 | Teich | |
| 5,901,803 A | * | 5/1999 | Harada | 180/69.2 |
| 6,030,029 A | * | 2/2000 | Tsuda et al. | 296/203.02 |
| 2002/0135207 A1 | * | 9/2002 | Sakyo | 296/190.08 |
| 2002/0149232 A1 | * | 10/2002 | Sakyo et al. | 296/190.08 |
| 2008/0006460 A1 | * | 1/2008 | Giovannini et al. | 180/69.2 |

FOREIGN PATENT DOCUMENTS

| | | |
|---|---|---|
| EP | 1 719 865 A2 | 11/2006 |
| EP | 1 719 865 A3 | 11/2006 |
| EP | 1 985 767 A1 | 10/2008 |
| JP | 5-64244 | 8/1993 |
| JP | 10-219741 | 8/1998 |
| JP | 2005-232795 | 9/2005 |
| JP | 2007-69673 | 3/2007 |

* cited by examiner

*Primary Examiner* — Glenn Dayoan
*Assistant Examiner* — Sunsurraye Westbrook
(74) *Attorney, Agent, or Firm* — Oblon, Spivak, McClelland, Maier & Neustadt, L.L.P.

(57) ABSTRACT

A working machine has a machine room cover and a bonnet on an upper rotating body. The bonnet has a frame-like raising member and a dome-like hood member that covers an opening in the upper part of the raising member. The lower part of the raising member is attached so as to surround an opening portion formed in the upper surface of the machine room cover, and the hood member is attached to the raising member so as to be able to be rotationally opened and closed.

3 Claims, 8 Drawing Sheets

WORKING MACHINE

BACKGROUND OF THE INVENTION

1. Field of the Invention

The present invention relates to a working machine such as a hydraulic shovel.

2. Description of the Related Art

If, for example, a cooler housed in a machine room is large and the upper end thereof projects outward through a machine room cover that covers the machine room, a dome-like bonnet (engine hood) is attached to the upper surface of the machine room cover, and the machine room is thereby partly raised to house the cooler.

For example, an engine hood disclosed in Japanese Unexamined Utility Model Registration Application Publication No. 5-64244 includes a standard hood of standard specification and a frame-like bulk hood on which the standard hood can be placed. A choice can be made between a case where the standard hood is directly joined to the machine room cover and a case where the bulk hood to which the standard hood is joined is joined to the machine room cover, and the height of the engine hood can thereby be adjusted.

This type of bonnet is manufactured at low cost, is lightweight and sufficiently rigid, and is therefore often made by pressing a steel sheet. However, if the size of the bonnet is too large, for example, a steel sheet out of which the bonnet is made is difficult to obtain. Even if a steel sheet can be obtained, forming is difficult, and the increased size of the die significantly increases the cost of manufacturing.

So, such a large-sized bonnet is made, for example, by joining a plurality of steel sheets by welding. However, there are problems of the strength of welding areas, the increased number of processes and components, the difficulty in handling due to the increased weight, and so forth.

Since the engine hood of Japanese Unexamined Utility Model Registration Application Publication No. 5-64244 includes the bulk hood, the height can be adjusted using the standard hood as it is. Therefore, this engine hood is effective in solving the above problems.

However, this engine hood is joined to the machine room cover and is integrated with the machine room cover. Therefore, the maintenance of a cooler and the like housed in the engine hood is structurally difficult. The work needs to be performed, for example, with a door provided in the side surface of the machine room open, or with the entire engine hood removed. In particular, the inside of the hood significantly projecting from the machine room is difficult to check and to reach, and the maintenance work requires time and effort.

SUMMARY OF THE INVENTION

An object of the present invention is to provide a working machine that can be easily maintained even if the working machine has a high and large bonnet.

To attain the above object, in the present invention, a bonnet is raised by a frame-like raising member, and the bonnet can be rotationally opened and closed.

Specifically, a working machine of the present invention includes a lower traveling body, a working machine main body mounted on the lower traveling body, and a machine room cover and a bonnet mounted on the working machine main body. The machine room cover has an opening portion formed in the upper surface thereof. The bonnet includes a frame-like raising member and a dome-like hood member that covers an opening in the upper part of the raising member. The lower part of the raising member is attached to the machine room cover so as to surround the opening portion, and the hood member is attached to the raising member so as to be able to be rotationally opened and closed.

In this case, the bonnet includes a frame-like raising member and a dome-like hood member. Therefore, even if the bonnet is high and large, the bonnet can be manufactured relatively easily and at low cost. Specifically, the hood member can be formed without regard to height, and can therefore be formed in the same manner as a conventional bonnet or in a similar manner to that of a conventional bonnet, by pressing a steel sheet. The height of the bonnet can be appropriately adjusted by the raising member, and the bonnet is therefore excellent in versatility.

In addition, since the hood member is attached to the raising member so as to be able to be rotationally opened and closed, opening the hood member uncovers the opening portion. Therefore, maintenance can be performed easily, and excellent workability can be obtained.

It is preferable that the raising member be attached to the machine room cover so as to be able to be rotationally opened and closed.

In this case, the bonnet including the raising member can be rotationally opened. Therefore, when the raising member obstructs work, for example, in the case of an inspection of the back of the bonnet, the workability can be further improved.

It is preferable that the raising member include a plurality of element members, and the plurality of element members include an attached member that supports the hood member and is attached to the machine room cover, and a detachable member that is detachable from the machine room cover.

In this case, since the detachable member that is a part of the raising member is detachable, opening the hood member and detaching the detachable member further improves the workability because the detachable member is removed.

It is preferable that the raising member be provided with a window portion that is openable and closable. In this case, for example, an inspection can be performed through the window portion, and the workability is therefore further improved.

DESCRIPTION OF THE PREFERRED EMBODIMENTS

The embodiments of the present invention will now be described in detail with reference to the drawings. The preferred embodiments described below are essentially illustrative only and are not intended to limit the present invention and the application or use thereof.

First Embodiment

Figure 1:
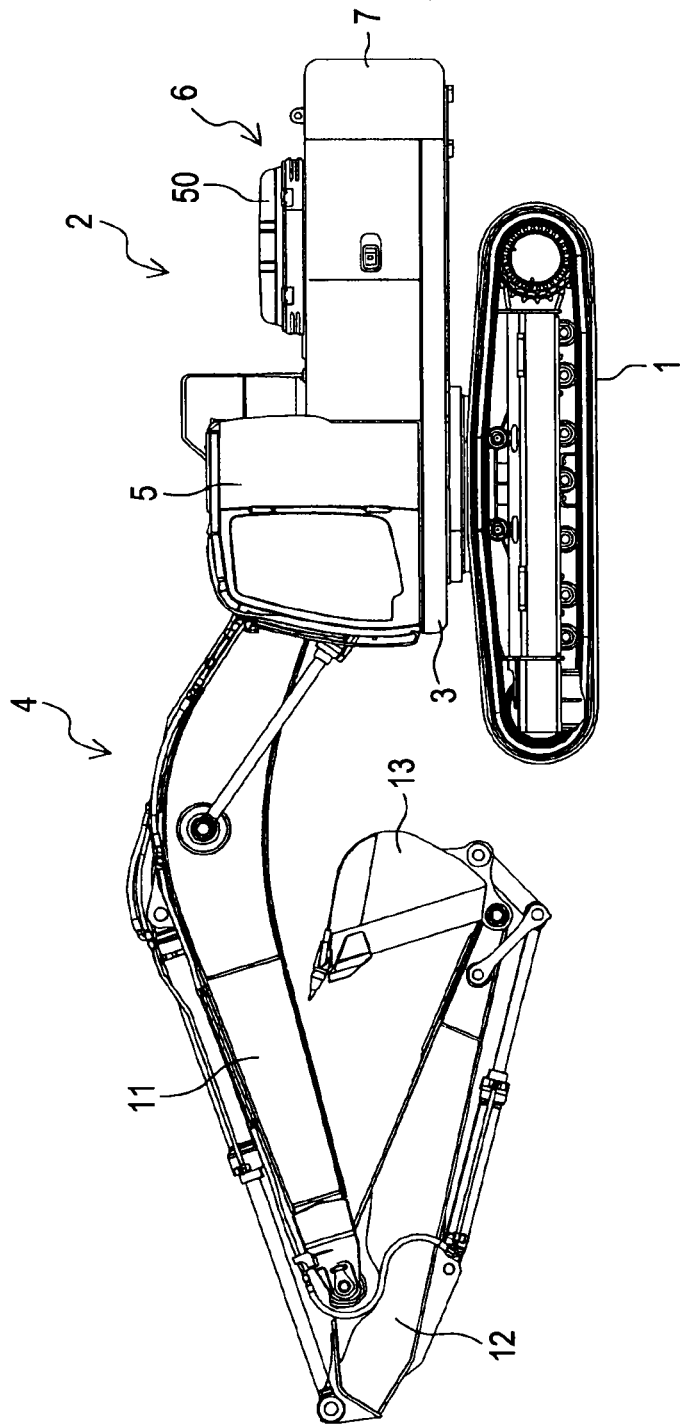
FIG. 1 is a side view showing the whole hydraulic shovel of a first embodiment.

FIG. 1 shows a hydraulic shovel (working machine) to which the present invention is applied. The hydraulic shovel includes a crawler-type lower traveling body 1, and a rotatable upper rotating body 2 (working machine main body) mounted thereon. The upper rotating body 2 includes a frame 3 to which are attached an attachment 4 (working device), a cab 5, a machine room 6, a counterweight 7, and so forth. In FIG. 1, the left side in the figure where the attachment 4 is located will be referred to as the front of the vehicle, and the near side in the figure where the cab 5 is located will be referred to as the left side of the vehicle. In the following description, the directions such as front, rear, left, and right are as defined above unless otherwise stated.

The attachment 4 is supported at the front center of the upper rotating body 2 so as to be able to be raised and lowered. The attachment 4 includes a substantially V-shaped boom 11 that is rotatably supported by a pair of vertical plates 3a, 3a (shown only in FIG. 2) provided on the frame 3, an arm 12 that extends in the longitudinal direction of the boom 11 and is rotatably supported by the boom 11, and a bucket 13 that is rotatably supported by the arm 12.

The cab 5 is a rectangular box-shaped operating room that is equipped with an operator's seat and various control and operating instruments. In this embodiment, the cab 5 is disposed on the left side of the front of the upper rotating body 2 so as to be located to the immediate left of the attachment 4.

Figure 2:
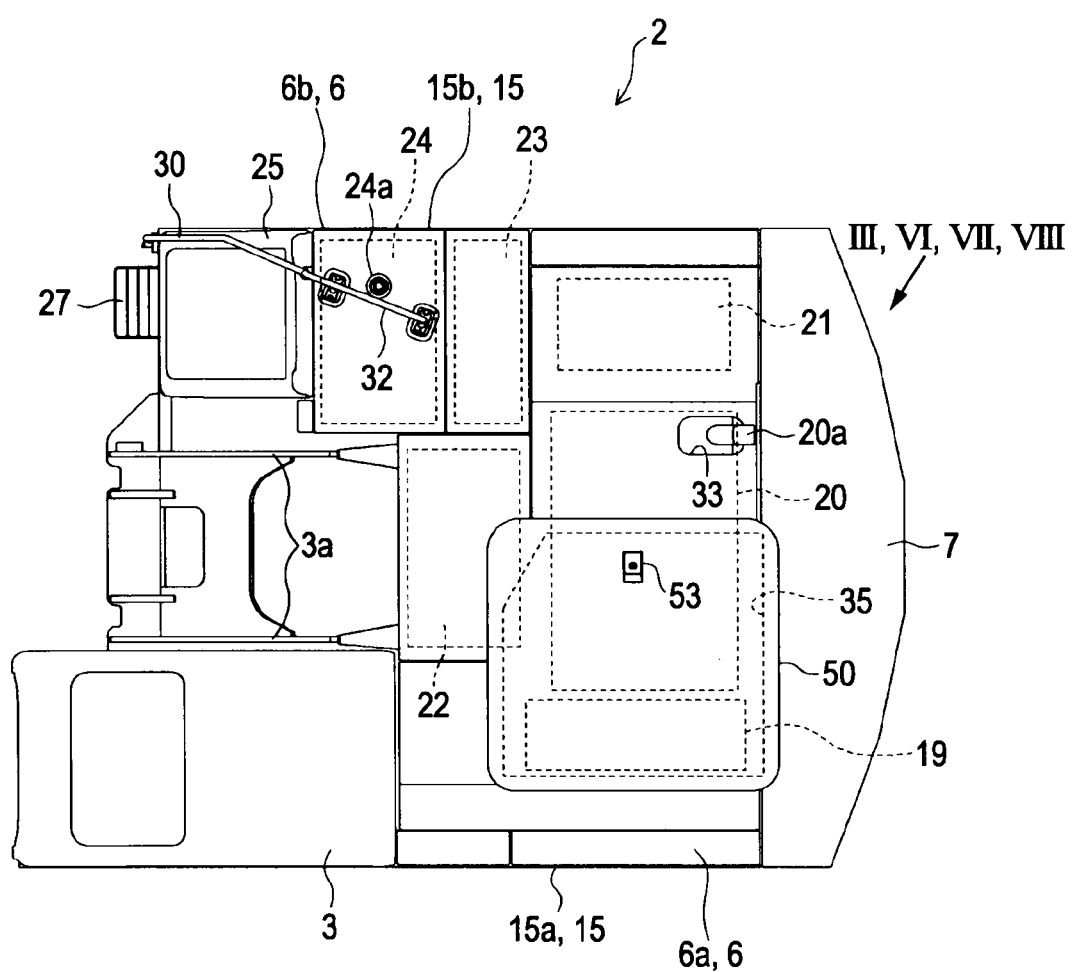
FIG. 2 is a schematic plan view of the hydraulic shovel with the lower traveling body, cab, and attachment omitted.

As shown in FIG. 2, the machine room 6 includes a rear machine room 6a that is disposed in the rear of the upper rotating body 2 so as to extend in the left-right direction, and a side machine room 6b that extends forward continuously from the right front of the rear machine room 6a and is disposed so as to be located to the right of the attachment 4. In a portion that extends in the left-right direction behind the rear machine room 6a, the counterweight 7 is disposed.

The machine room 6 is covered by a group of machine room covers 15. Specifically, the rear machine room 6a is covered by a group of rear covers 15a, and the side machine room 6b is covered by a group of side covers 15b.

Inside the machine room 6, a drive unit that controls the drive of the working machine and so forth are disposed. Specifically, in the rear of the rear machine room 6a, a cooler 19, an engine 20, and a pump 21 are arranged in this order from left to right; and in the front center of the rear machine room 6a, a control valve 22 is disposed.

An operating oil tank 23 that stores operating oil is disposed so as to extend from the right front portion of the rear machine room 6a to the side machine room 6b and to adjoin the right side of the control valve 22 and the front of the pump 21. In addition, a fuel tank 24 that stores fuel is disposed so as to adjoin the front of the operating oil tank 23. A trunk room 25 that can house, for example, equipment is disposed so as to adjoin the front of the fuel tank 24. Reference numeral 24a denotes a fuel inlet.

The trunk room 25 portion is lower than the other portions of the side machine room 6b. The trunk room 25 serves as a step of a stairway that a worker climbs up to and down from the upper surface of the machine room cover 15. In a portion of the frame 3 located in front of and below the trunk room 25, a flight of steps 27 is provided so as to project forward. To assist the worker in going up and down, a handrail 30 is provided so as to extend substantially in the front-rear direction along the stairway. The handrail 30 is made by bending a metal pipe into an arch shape by pressing. On the upper surface of the side cover 15b, a safety fence 32 similar to the handrail 30 is provided so as to connect with the hand rail 30.

The upper surface of the machine room cover 15 except for the trunk room 25 portion and the upper surface of the counterweight 7 are flat surfaces of substantially the same height. To the right of the middle in the left-right direction of the upper surface of the rear cover 15a is an exhaust opening 33 through which an exhaust pipe 20a projects. Near the left corner of the upper surface of the rear cover 15a is a large, substantially rectangular maintenance opening portion 35 (see FIG. 6). A bonnet 50 is provided so as to cover the opening portion 35.

Figure 3:
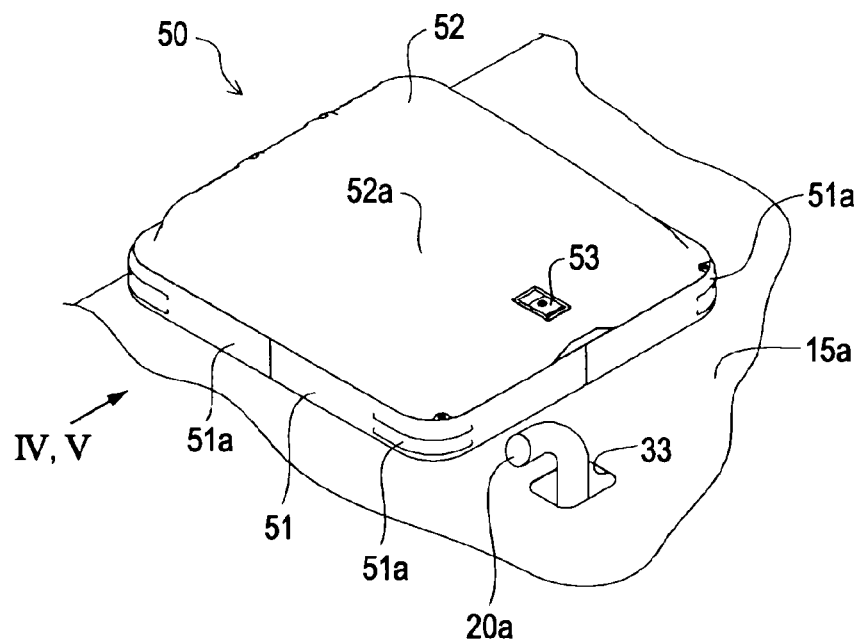
FIG. 3 is a schematic perspective view showing a bonnet and its surroundings as viewed from the direction of arrow III in FIG. 2.
Figure 4:
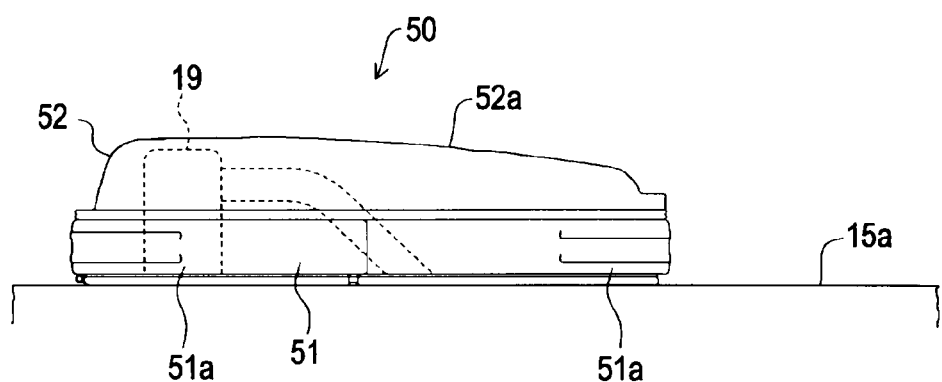
FIG. 4 is a rear view of the bonnet as viewed from the direction of arrow IV in FIG. 3.

As shown in FIGS. 1, 3, and 4, compared to conventional bonnets, the bonnet 50 is rectangular dome-shaped so as to significantly project upward from the upper surface of the rear cover 15a. The bonnet 50 includes a raising member 51 and a hood member 52 attached on the top of the raising member 51.

The raising member 51 is rectangular frame-shaped. The upper and lower edges of the raising member 51 are bent inward, so the raising member 51 has a substantially U-shaped cross section. The raising member 51 includes front, rear, left, and right sidewalls. The raising member 51 having such a shape is formed by joining four L-shaped members 51a of the same size and shape formed by pressing a steel sheet.

The hood member 52 is formed by pressing a steel sheet into an upward-bulging rectangular dome shape, and has substantially the same outer dimensions as the raising member 51 so as to cover the opening in the upper part of the raising member 51. While the hood member 52 has substantially the same form as conventional bonnets, the hood member 52 is characterized in that the left side is slightly higher than the right side, and on the upper surface thereof, a sloping surface 52a is formed that slopes downward from left to right. On the upper surface thereof, a lock member 53 is attached that disables opening and closing.

Figure 5:
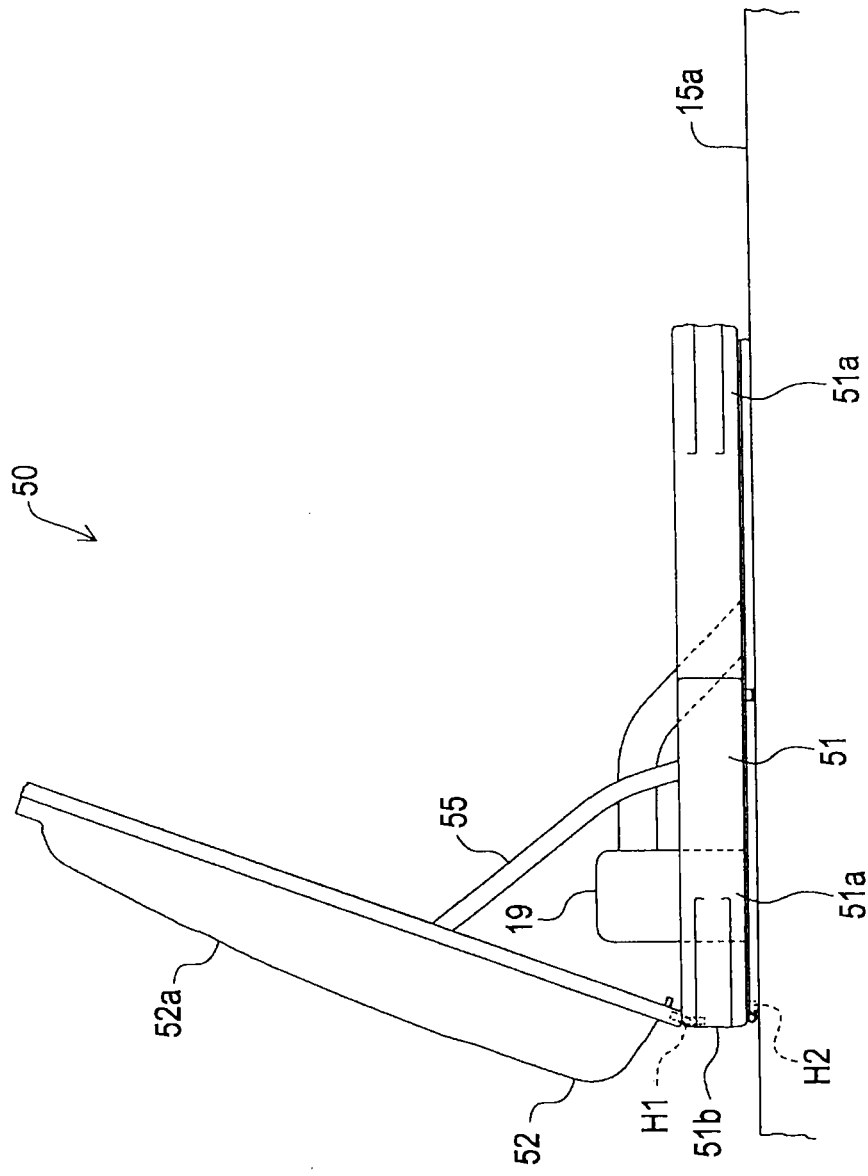
FIG. 5 is a rear view of the bonnet with the hood member open as viewed from the direction of arrow V in FIG. 3.
Figure 6:
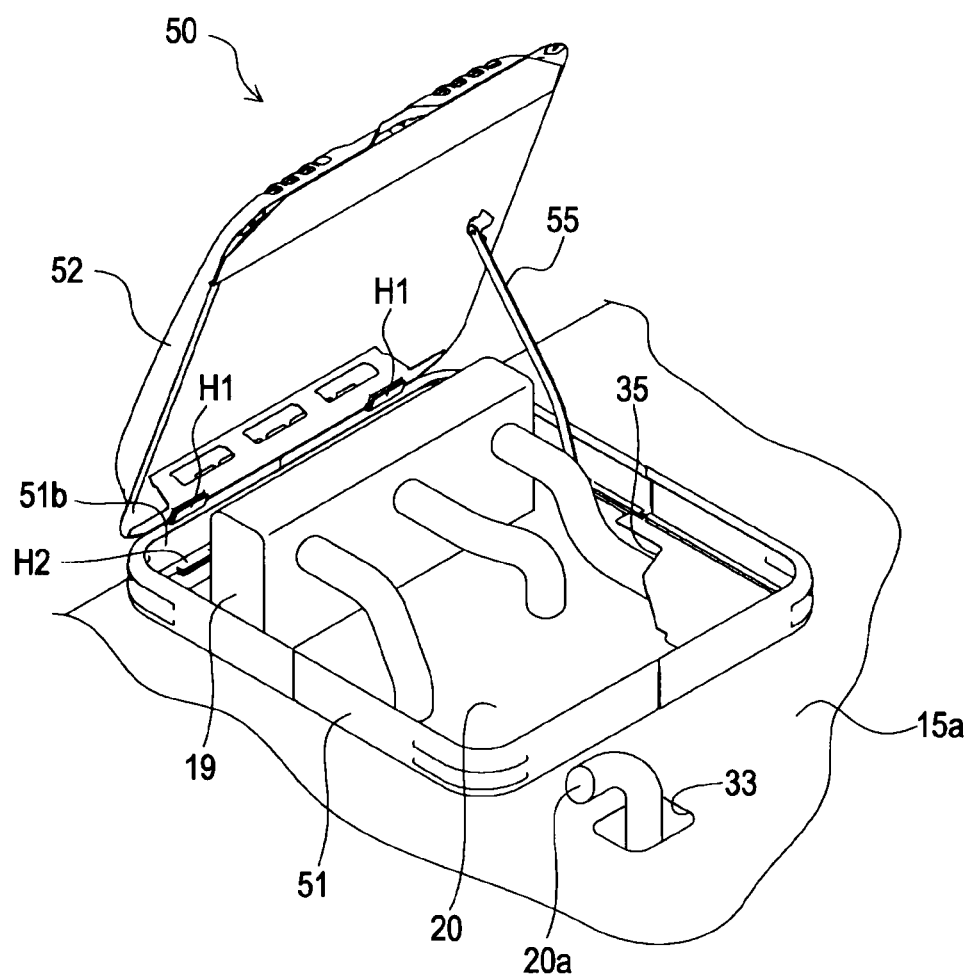
FIG. 6 is a schematic perspective view of the bonnet with the hood member open as viewed from the direction of arrow VI in FIG. 2.

As shown in FIGS. 5 and 6, the hood member 52 is placed on the raising member 51, and the left lower edge thereof is attached to the raising member 51 with a pair of hinges H1, H1 so that the hood member 52 can be rotationally opened and closed about the lower edge thereof. On the front edge of the hood member 52, an arm member 55 is rotatably attached that is hooked to a hook (not shown) in the machine room 6 so as to hold the hood member 52 open. In a place where the hood member 52 and the raising member 51 are in contact with each other, a waterproof seal member (not shown) is disposed to secure sealing performance.

The raising member 51 is attached to the rear cover 15a in such a manner that the lower part thereof surrounds the opening portion 35. The upper end of the cooler 19 housed in the machine room 6 projects through the opening portion 35 of the rear cover 15a, and the upper end is housed in the bonnet 50.

In addition, beneath the bonnet 50, areas that require periodic inspection (not shown), such as an area where the radiator is checked for leaks, an area where the tension of the belt of the engine is checked, and an area where the engine oil level gauge is checked, are disposed intensively.

In this embodiment, the cooler 19 is located on the left side of the opening portion 35. Therefore, as described above, the left part of the bonnet 50 is set relatively high, the upper end of the cooler 19 is located near the raised upper surface of the hood member 52, and the height of the bonnet 50 is thereby minimized.

Since the rotation axis is located on the left side where the center of gravity is located, the hood member 52 can be rotationally opened and closed with relatively little force.

Since the hood member 52 is attached to the raising member 51 so as to be able to be rotationally opened and closed, opening the hood member 52 exposes the upper part of the cooler 19. Therefore, maintenance is facilitated, and workability is improved.

Figure 7:
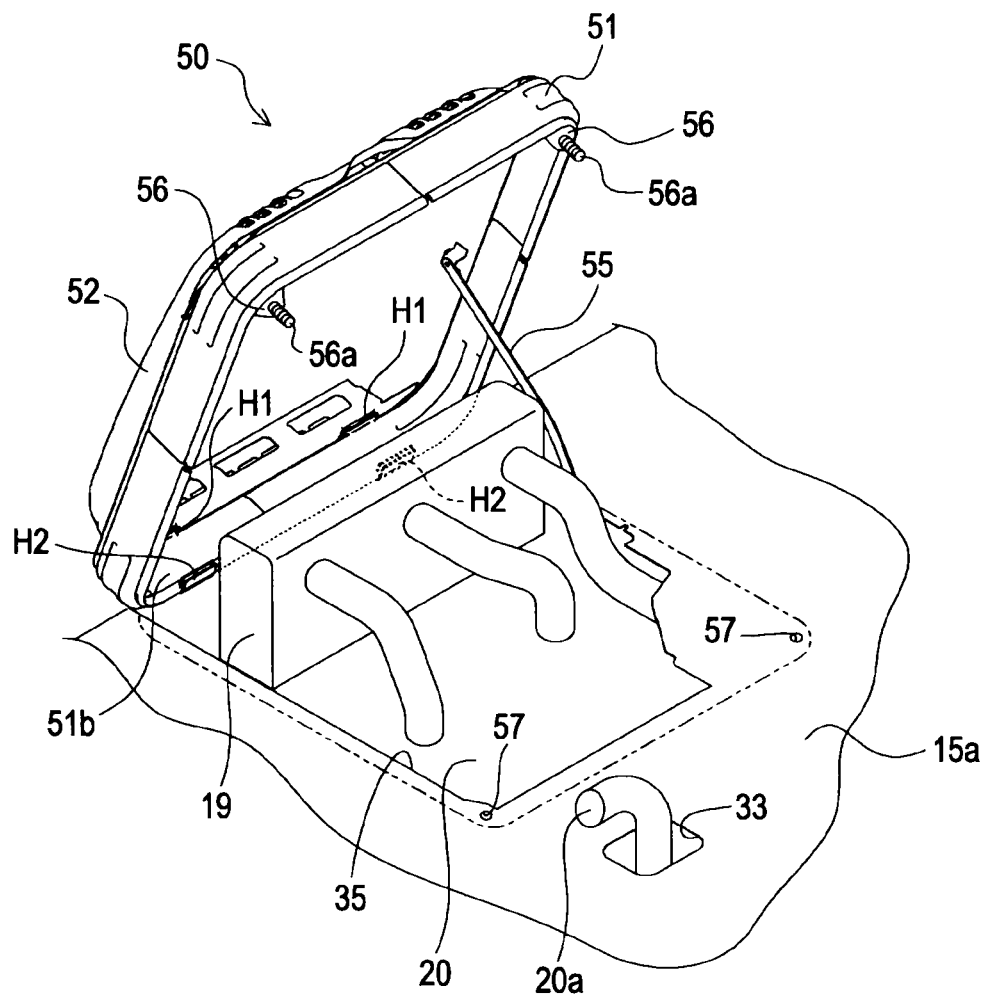
FIG. 7 is a schematic perspective view of the bonnet with the raising member open as viewed from the direction of arrow VII in FIG. 2.

In the case of the bonnet 50 of this embodiment, as shown in FIG. 7, the raising member 51 is also attached to the rear cover 15a so as to be able to be rotationally opened and closed.

Specifically, (as in the hood member 52,) the lower edge of the left sidewall 51b of the raising member 51 is attached to the rear cover 15a with a pair of hinges H2, H2 so that the raising member 51 can be rotationally opened and closed about the lower edge thereof.

At each end of the lower edge of the right sidewall of the raising member 51, a fastening supporting portion 56 is provided that rotatably supports a fastening bolt 56a. Two bolt fastening holes 57 that correspond to the fastening bolts 56a and into which the fastening bolts 56a are screwed, are formed in the upper surface of the rear cover 15a. In a place where the raising member 51 and the rear cover 15a are in contact with each other, a waterproof seal member (not shown) is disposed.

Usually, the fastening bolts 56a are screwed in the bolt fastening holes 57, and the raising member 51 is fixed to the rear cover 15a. In the case of periodic inspection, areas to be inspected are intensively disposed beneath the bonnet 50. Therefore, although the bonnet 50 is high, inspection can be performed relatively easily. Therefore, in such a case, work is performed with the hood member 52 open. On the other hand, in the case of not periodic inspection but heavy maintenance, such as component replacement or the maintenance of an area distant from the area beneath the bonnet 50, the raising member 51 obstructs the work. So, the fastening bolts 56a are removed from the bolt fastening holes 57, and the raising member 51 is rotated. This makes the opening portion 35 more accessible and improves the workability.

Second Embodiment

Figure 8:
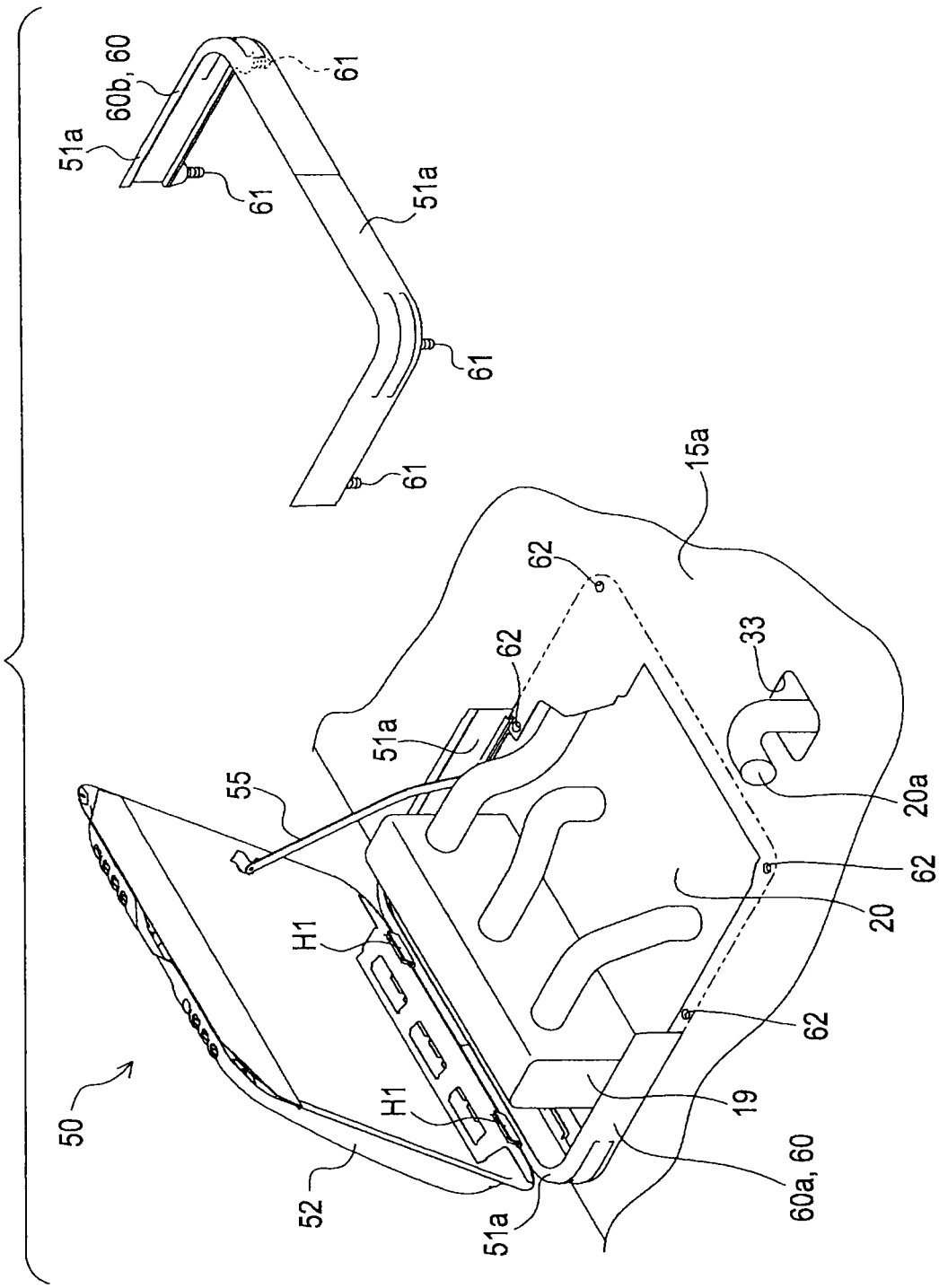
FIG. 8 is a schematic perspective view illustrating a second embodiment as viewed from the direction of arrow VIII in FIG. 2.

FIG. 8 shows a second embodiment of the present invention. In this embodiment, the raising member 51 includes a plurality of element members, and some of them are detachable. In the following description, the differences from the first embodiment will be described in detail, and the same reference numerals will be used to designate the same components as those in the first embodiment, so the description thereof will be omitted.

The raising member 51 in this embodiment includes two element members (halves) 60a and 60b that are joined together so as to be able to be separated. Specifically, by joining two of the above-described four L-shaped members 51a, two U-shaped element members 60, 60 of the same size and shape are formed. The raising member 51 is formed of the two element members 60, 60.

The hood member 52 is attached to one of the element members (attached member) 60a, which is fixed by welding to the rear cover 15a so as to surround the left part of the opening portion 35. The other element member (detachable member) 60b is provided with fastening bolts (fixing portions) 61 that are rotatably supported at a plurality of places on the lower edge of the detachable member 60b. Fastening holes (fixed portion) 62 that correspond to the fastening bolts 61 and into which the fastening bolts 61 are screwed, are provided at a plurality of places in the upper surface of the rear cover 15a.

The attached member 60a fixed to the rear cover 15a is U-shaped and has an enhanced-rigidity structure. Therefore, although the attached member 60a is a part of the raising member 51, the hood member 52 is firmly supported. Usually, the fastening bolts 61 are screwed in their respective fastening holes 62, and the detachable member 60b is joined to the attached member 60a and is fixed to the rear cover 15a.

In the case of periodic inspection, as in the first embodiment, the hood member 52 is opened and closed to perform the work. In the case of heavy maintenance, the hood member 52 is opened and the detachable member 60b is detached so that the right part of the opening portion 35 can be highly accessible. Since the detachable member 60b is removed, work can be performed without being obstructed by the raising member 51, and the workability is improved. The attached member 60a may be detachably attached to the rear cover 15a, for example, by fastening, or may be rotatably attached.

Third Embodiment

Figure 9:
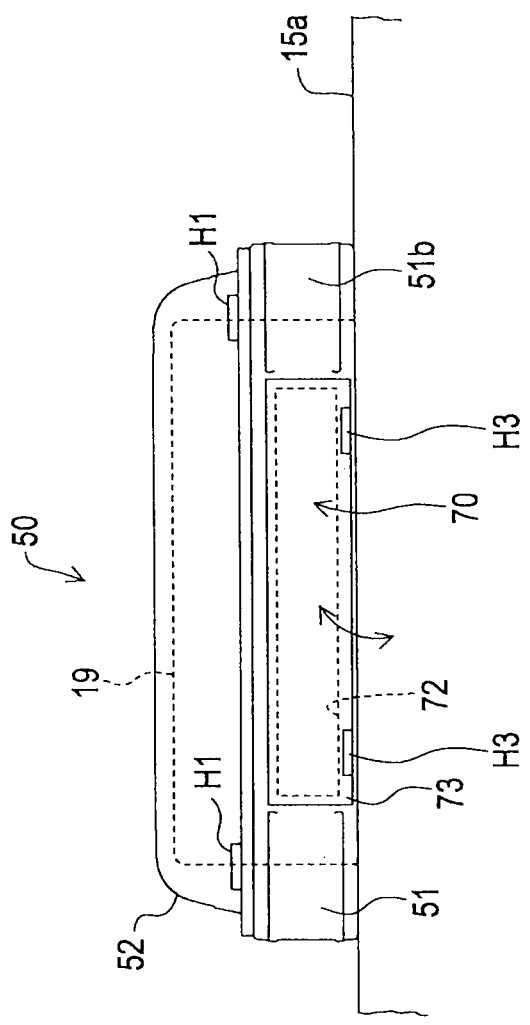
FIG. 9 is a schematic side view illustrating a third embodiment.

FIG. 9 shows a third embodiment of the present invention. This embodiment differs from the first and second embodiments in that the raising member 51 is provided with an openable and closable window portion 70. Also in this embodiment, the differences from the first and second embodiments will be described in detail, and the same reference numerals will be used to designate the same components as those in the first and second embodiments, so the description thereof will be omitted.

For example, in the cases of the above-described embodiments, the work near the left sidewall 51b of the raising member 51 can be obstructed by the raising member 51 and the hood member 52. So, a window portion 70 is provided in the sidewall by which the hood member 52 is supported (also referred to as supporting sidewall 51b), so as to be able to be opened and closed as needed.

Specifically, a horizontally long belt-like opening 72 is formed in the supporting sidewall 51b, and a lid 73 that covers the belt-like opening 72 is attached to the supporting sidewall 51b with a pair of hinges H3, H3 so as to be able to be rotationally opened and closed.

When work is performed near the supporting sidewall 51b, the lid 73 is opened to uncover the belt-like opening 72. So, work can be performed while looking closely, for example, at the cooler 19 located near the supporting sidewall 51b, and the workability is further improved. Not only the supporting sidewall 51b but also the other sidewalls may be provided with the window portion 70.

As described above, maintenance can be easily performed without being obstructed by the bonnet even if the bonnet is high and large, so the present invention can provide a working machine that is excellent in workability.

A working machine according to the present invention is not limited to the above-described embodiments and includes other various configurations.

For example, although the raising member 51 is attached to the rear cover 15a so as to be able to be rotationally opened and closed in the first embodiment, the raising member 51 may be fixed to the rear cover 15a by welding. The raising member 51 may be detachably fixed to the rear cover 15a by fastening.

In the second embodiment, the two element members 60 have the same shape. However, they do not always have to have the same shape. The raising member 51 may include three or more element members 60 as needed.

In the first and second embodiments, the raising member 51 is fixed to the rear cover 15a by fastening. However, the method of fixing is not limited to fastening. Any method can be used as long as the raising member 51 can be detachably fixed.

In the first embodiment, the hood member 52 and the raising member 51 are attached so as to be able to be rotationally opened and closed about the edges on the same side, that is, on the left side. However, the hood member 52 and the raising member 51 may be attached so as to be able to be rotationally opened and closed about the edges on the different sides.

When one works with the hood member 52 open, the work near the supporting sidewall 51b can be difficult. If the raising member 51 is attached so as to be able to be rotationally opened and closed about the edge, for example, on the rear or right side, opening the raising member 51 clears the area near the supporting sidewall 51b and therefore facilitates the work.

In the first embodiment, the raising member 51 is attached to the rear cover 15a so as to be able to be rotationally opened and closed about one of the sidewalls thereof in the opposite side direction. However, the raising member 51 may be attached so as to be able to be rotationally opened and closed about one of the corners thereof in the diagonal direction. In this case, the bonnet 50 is less obstructive to the work, and the workability is improved.

The direction in which the bonnet 50 is attached to the rear cover 15a can be appropriately selected according to the position, for example, of the cooler 19. The left side of the bonnet 50 does not always have to be raised. The bonnet 50 does not always have to be supported on the left side.

Although the invention has been described with reference to the preferred embodiments in the attached figures, it is noted that equivalents may be employed and substitutions made herein without departing from the scope of the invention as recited in the claims.

What is claimed is:

1. A working machine comprising:
   a lower traveling body;
   a working machine main body mounted on the lower traveling body; and
   a machine room cover and a bonnet mounted on the working machine main body, the machine room cover including an opening portion formed in the upper surface thereof,
   the bonnet comprising:
   a raising member including a surrounding wall, the surrounding wall being continuously provided around an axis extending in up and down directions and the raising member extending upward beyond the upper surface of the machine room cover in a state that the raising member is attached to the machine room cover;
   a hood member that covers an opening in the upper part of the raising member;
   wherein the lower part of the raising member is attached to the machine room cover so as to surround the opening portion;
   wherein the hood member is attached to the raising member so as to be able to be rotationally opened and closed; and
   wherein the raising member is attached to the machine room cover so as to be able to be rotationally opened and closed.

2. The working machine according to claim 1, wherein the raising member includes a plurality of element members, and the plurality of element members include an attached member that supports the hood member and is attached to the machine room cover, and a detachable member that is detachable from the machine room cover.

3. The working machine according to claim 1, wherein the raising member is provided with a window portion that is openable and closable.

* * * * *